US010606951B2

(12) United States Patent
Abrahams et al.

(10) Patent No.: US 10,606,951 B2
(45) Date of Patent: Mar. 31, 2020

(54) OPTIMIZING RESOURCE ALLOCATION TO A BID REQUEST RESPONSE BASED ON COGNITIVE ANALYSIS OF NATURAL LANGUAGE DOCUMENTATION

(71) Applicant: International Business Machines Corporation, Armonk, NY (US)

(72) Inventors: Faried Abrahams, Laytonsville, MD (US); Rashida A. Hodge, Ossining, NY (US); Gandhi Sivakumar, Bentleigh (AU); Amol A. Dhondse, Kothrud (IN); Anand Pikle, Pune (IN)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/954,933

(22) Filed: Apr. 17, 2018

(65) Prior Publication Data

US 2019/0317991 A1    Oct. 17, 2019

(51) Int. Cl.
*G06F 16/00* (2019.01)
*G06F 17/27* (2006.01)
(Continued)

(52) U.S. Cl.
CPC ........ *G06F 17/278* (2013.01); *G06F 16/9024* (2019.01); *G06F 16/9038* (2019.01);
(Continued)

(58) Field of Classification Search
CPC ..................................................... G06F 16/00
See application file for complete search history.

(56) References Cited

U.S. PATENT DOCUMENTS 7,027,974 B1    4/2006 Busch et al.
8,744,916 B2    6/2014 Nalik
(Continued)

OTHER PUBLICATIONS

Denny et al., "Evaluation of a Method to Identify and Categorize Section Headers in Clinical Documents", Journal of the American Medical Informatics Association, vol. 16, No. 6, Nov./Dec. 2009, pp. 806-815.

(Continued)

*Primary Examiner* — Shreyans A Patel
(74) *Attorney, Agent, or Firm* — Nicholas D. Bowman; Madeline F. Scheiesser; Keohane & D'Alessandro PLLC

(57) ABSTRACT

Approaches presented herein enable optimizing resource allocation to a bid request response based on a cognitive analysis of natural language artifacts. More specifically, a bid request and a plurality of supporting artifacts in a natural language are obtained. A cognitive analysis of the request and supporting artifacts is performed to extract a set of information entities. The extracted information entities are normalized using a lexical-relations based graph database to classify the set of extracted information entities as standardized concepts. A subset of the set of the standardized concepts is identified as a set of parameters corresponding to a set of predetermined variables. Each variable of the set of predetermined variables is weighted according to a likelihood that the variable indicates a relevance of a resource. A probability that a particular resource is relevant is determined based on the weighting and that resource is assigned to the bid request response.

20 Claims, 4 Drawing Sheets

(51) Int. Cl.
*G06N 20/00* (2019.01)
*G06F 16/901* (2019.01)
*G06F 16/9038* (2019.01)
*G06F 16/9032* (2019.01)

(52) U.S. Cl.
CPC ...... *G06F 16/90332* (2019.01); *G06F 17/277* (2013.01); *G06N 20/00* (2019.01)

(56) References Cited

U.S. PATENT DOCUMENTS

| | | | |
|---|---|---|---|
| 2009/0265205 A1* | 10/2009 | Stinchcombe | G06Q 10/06 705/37 |
| 2012/0239440 A1* | 9/2012 | Miller | G06F 17/2785 705/5 |
| 2014/0278981 A1* | 9/2014 | Mersov | G06Q 30/02 705/14.53 |
| 2017/0161850 A1 | 6/2017 | Allin et al. | |

OTHER PUBLICATIONS

Anonymous, "Method and System for sharing application data with vendors in an online market place to solicit more accurate bids for services", IP.com Prior Art Database, IP No. IPCOM000241717D, May 26, 2015, 4 pgs.

Anonymous, "Real Time Solution Builder on Marketplace through Social and Cognitive computing", IP.com Prior Art Database, IP No. IPCOM000248312D, Nov. 15, 2016, 5 pgs.

Anonymous, "Analyzing Responses to Requests for Proposals", IP.com Prior Art Database, IP No. IPCOM000250335D, Jun. 29, 2017, 5 pgs.

Li et al., "Recursive Deep Models for Discourse Parsing", Proceedings of the 2014 Conference on Empirical Methods in Natural Language Processing (EMNLP), pp. 2061-2069, Oct. 25-29, 2014.

* cited by examiner

OPTIMIZING RESOURCE ALLOCATION TO A BID REQUEST RESPONSE BASED ON COGNITIVE ANALYSIS OF NATURAL LANGUAGE DOCUMENTATION

TECHNICAL FIELD

The present invention relates generally to cognitive analysis of documents in a natural language and, more specifically, to optimizing the fulfillment of roles and responsibilities in a commercial bid request response based on a cognitive analysis of supporting documents.

BACKGROUND

For many organizations, working on a commercial bid request proposal poses several challenges. These challenges may include properly comprehending a customer's terminology and keywords, which may be unfamiliar to the organization. As such, often within a short timeline, it becomes necessary for the organization to cross-reference and understand the customer's evaluation process to successfully interpret the bid request and create an effective bid. Furthermore, it is often necessary to involve several consultants, specialists, and decision makers from across several departments in the process of creating a bid proposal. However, this may require several departments to collaborate and coordinate the analysis of the bid request as well as each department's contribution to the bid proposal.

SUMMARY

Approaches presented herein enable optimizing resource allocation to a bid request response based on a cognitive analysis of natural language artifacts. More specifically, a bid request and a plurality of supporting artifacts in a natural language are obtained. A cognitive analysis of the request and supporting artifacts is performed to extract a set of information entities. The extracted information entities are normalized using a lexical-relations based graph database to classify the set of extracted information entities as standardized concepts. A subset of the set of the standardized concepts is identified as a set of parameters corresponding to a set of predetermined variables. Each variable of the set of predetermined variables is weighted according to a likelihood that the variable indicates a relevance of a resource. A probability that a particular resource is relevant is determined based on the weighting and that resource is assigned to the bid request response.

One aspect of the present invention includes a method for optimizing resource allocation to a bid request response based on a cognitive analysis of natural language artifacts, comprising: obtaining a request and a plurality of supporting artifacts in a natural language; performing a cognitive analysis of the request and supporting artifacts to extract a set of information entities; normalizing the extracted information entities using a lexical-relations based graph database to classify the set of extracted information entities as standardized concepts with which the set of extracted information entities are most closely associated; identifying, for a portion of the request, at least a subset of the set of the standardized concepts, with which the set of extracted information entities are most closely associated, as a set of parameters corresponding with a set of predetermined variables; weighting each variable of the set of predetermined variables according to a likelihood that the variable indicates a relevance of a resource to the portion of the request; and assigning a particular resource to the bid request response in response to a probability that the particular resource is relevant to the portion of the request based on the weighted variables.

Another aspect of the present invention includes a computer system for optimizing resource allocation to a bid request response based on a cognitive analysis of natural language artifacts, the computer system comprising: a memory medium comprising program instructions; a bus coupled to the memory medium; and a processor, for executing the program instructions, coupled to a bid request analysis engine via the bus that when executing the program instructions causes the system to: obtain a request and a plurality of supporting artifacts in a natural language; perform a cognitive analysis of the request and supporting artifacts to extract a set of information entities; normalize the extracted information entities using a lexical-relations based graph database to classify the set of extracted information entities as standardized concepts with which the set of extracted information entities are most closely associated; identify, for a portion of the request, at least a subset of the set of the standardized concepts, with which the set of extracted information entities are most closely associated, as a set of parameters corresponding with a set of predetermined variables; weight each variable of the set of predetermined variables according to a likelihood that the variable indicates a relevance of a resource to the portion of the request; and assign a particular resource to the bid request response in response to a probability that the particular resource is relevant to the portion of the request based on the weighted variables.

Yet another aspect of the present invention includes a computer program product for optimizing resource allocation to a bid request response based on a cognitive analysis of natural language artifacts, the computer program product comprising a computer readable hardware storage device, and program instructions stored on the computer readable hardware storage device, to: obtain a request and a plurality of supporting artifacts in a natural language; perform a cognitive analysis of the request and supporting artifacts to extract a set of information entities; normalize the extracted information entities using a lexical-relations based graph database to classify the set of extracted information entities as standardized concepts with which the set of extracted information entities are most closely associated; identify, for a portion of the request, at least a subset of the set of the standardized concepts, with which the set of extracted information entities are most closely associated, as a set of parameters corresponding with a set of predetermined variables; weight each variable of the set of predetermined variables according to a likelihood that the variable indicates a relevance of a resource to the portion of the request; and assign a particular resource to the bid request response in response to a probability that the particular resource is relevant to the portion of the request based on the weighted variables.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
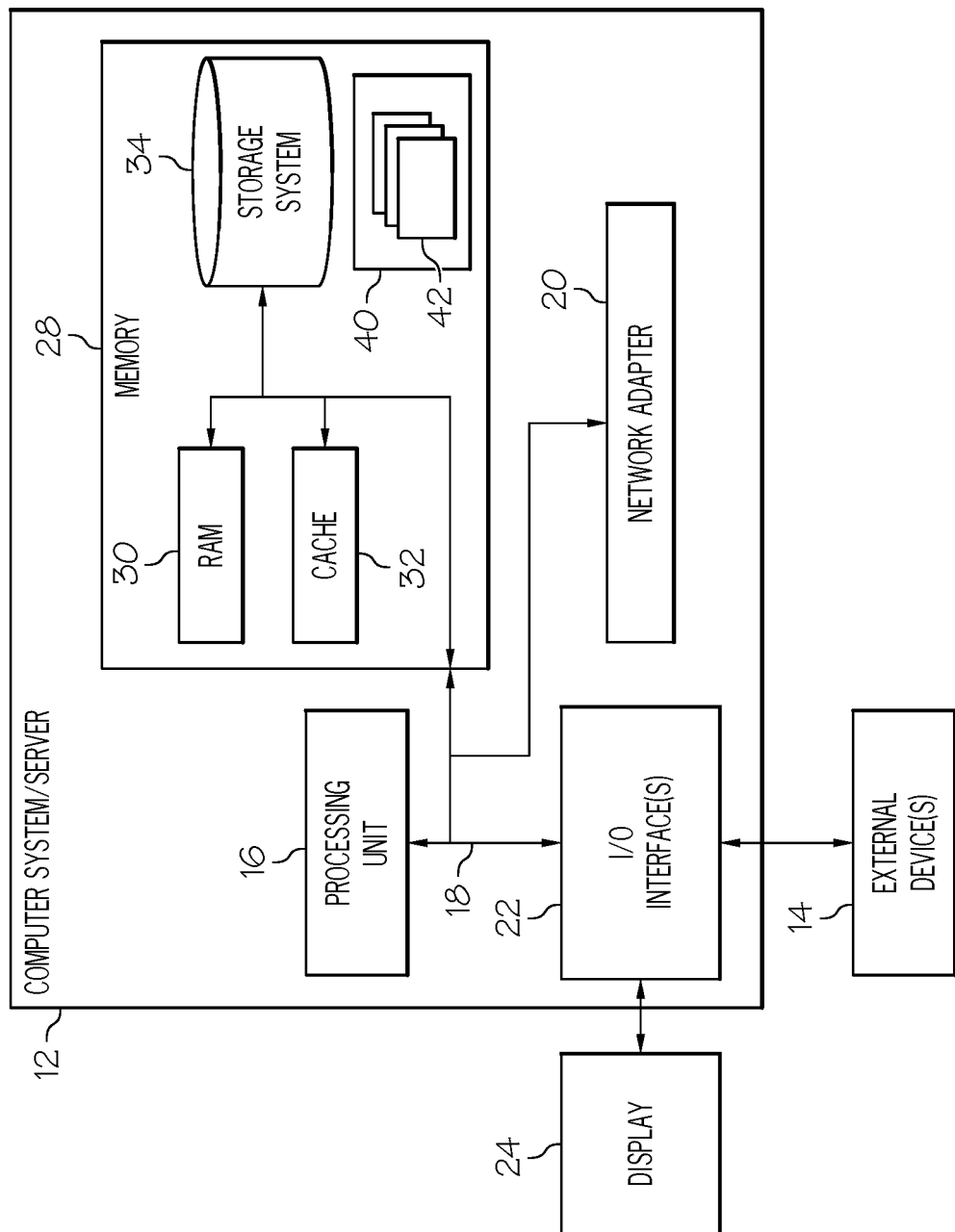
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for optimizing resource allocation to a bid request response based on a cognitive analysis of natural language artifacts. More specifically, a bid request and a plurality of supporting artifacts in a natural language are obtained. A cognitive analysis of the request and supporting artifacts is performed to extract a set of information entities. The extracted information entities are normalized using a lexical-relations based graph database to classify the set of extracted information entities as standardized concepts. A subset of the set of the standardized concepts is identified as a set of parameters corresponding to a set of predetermined variables. Each variable of the set of predetermined variables is weighted according to a likelihood that the variable indicates a relevance of a resource. A probability that a particular resource is relevant is determined based on the weighting and that resource is assigned to the bid request response.

Referring now to FIG. 1, a computerized implementation 10 of an embodiment for optimizing resource allocation to a bid request response based on a cognitive analysis of natural language artifacts will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for optimizing resource allocation to a bid request response based on a cognitive analysis of natural language artifacts. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for optimizing resource allocation to a bid request response based on a cognitive analysis of natural language artifacts, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that, for many organizations, working on a proposal responsive to a commercial bid request poses several challenges, such as using a customer's terminology and keywords, understanding the customer's evaluation process, and interpreting the customer's commercial bid request within a typically very short timeline. Often, this process can require reviewing at least hundreds of pages of documentation, while ensuring that all resources across several departments seamlessly function together. It is common for several consultants, specialists and decision makers to be involved in the bid proposal process, rather than simply one department or individual. Therefore, responding to a bid request may require multiple departments to analyze, collaborate, and contribute during the proposal/bid development process. Furthermore, with no industry standardization for such proposals and with varying and unique formats and components for each solution, it can be difficult to produce an effective bid proposal in a time-bound manner. For example, assessing and prioritizing the needs of the organization and the customer, such as which features and capabilities should be prioritized for each "ask" of the bid request, can be a daunting and infeasible task for a person or group of persons.

Moreover, present processes and tools for responding to a request for a commercial bid proposal have several limitations. These limitations include the inability to identify relevant roles within the organization based on industry or domain taxonomy and contextual factors, thereby failing to ensure consistent and comprehensive participation and collaboration by all necessary departments or stakeholders. These limitations further include the necessity of relying on manual and cumbersome analysis to align the right people for developing the bid proposal response. Such manual analysis can be highly inefficient and ineffective because a human analyzer does not have the time or ability to review all potentially relevant documentation (which can number in the hundreds or thousands of pages) or assess how each department or stakeholder may fit within the context of the bid proposal response in the short time permitted between when a bid request is received and when a response is due.

Accordingly, the inventors of the present invention have developed a system that uses entity-relationship analysis and deep learning methods to analyze specialization dimensions in commercial bid documents with efficiency. Embodiments of the present invention further leverage graphical database concepts in combination with supervised learning techniques that use contextual parameters related to, among other things, an industry or domain, a client, a nature of a deal, and an identity of a bidder organization. Based on this analysis, a determination of a set of roles that need to be involved in a commercial bid proposal is enabled.

Furthermore, embodiments of the present invention offer several advantages for optimizing resource allocation to a bid request response based on a cognitive analysis of natural language artifacts. For example, embodiments of the present invention enable the identification of roles relevant to each document section of a commercial bid proposal request at both an atomic and an aggregate level based on industry or domain taxonomy and contextual factors. This ensures consistent and comprehensive participation and collaboration by all necessary departments or stakeholders in drafting a commercial bid. Furthermore, embodiments of the present invention enable processing of techno-functional bid documents as well as supporting artifacts with an efficiency and capability exceeding that of a human being, permitting a thorough analysis to be performed on these documents within the short confines of a commercial bid window.

Figure 2:
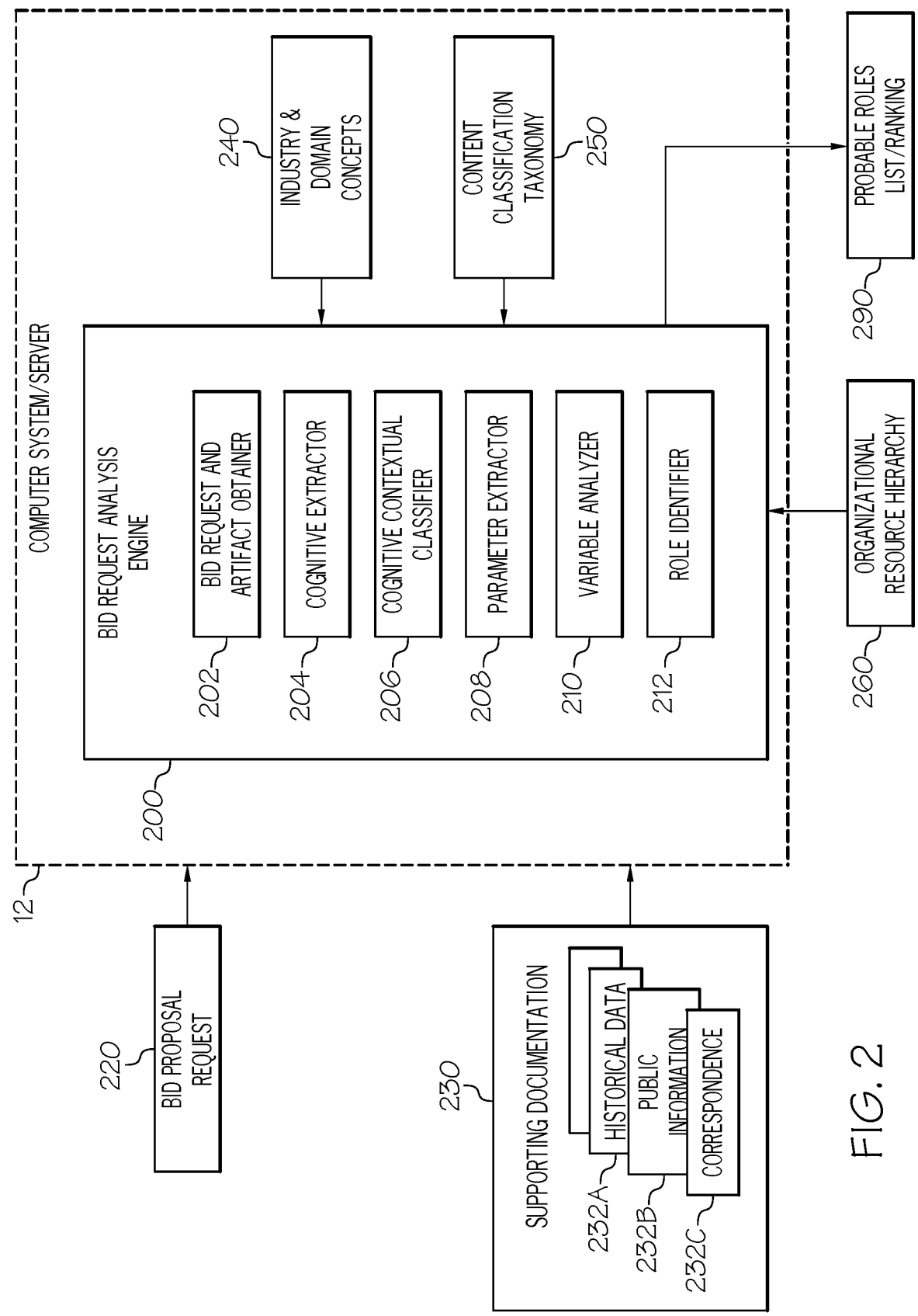
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment). A stand-alone computer system/server 12 is shown in FIG. 2 for illustrative purposes only. In the event the teachings recited herein are practiced in a networked computing environment, each client need not have a bid request analysis engine 200 (hereinafter "system 200"). Rather, all or part of system 200 could be loaded on a server or server-capable device that communicates (e.g., wirelessly) with the clients to provide for optimizing resource allocation to a bid request response based on a cognitive analysis of natural language artifacts. Regardless, as depicted, system 200 is shown within computer system/server 12. In general, system 200 can be implemented as program/utility 40 on computer system 12 of FIG. 1 and can enable the functions recited herein.

Along these lines, system 200 may perform multiple functions similar to a general-purpose computer. Specifically, among other functions, system 200 can optimize resource allocation to a bid request response based on a cognitive analysis of natural language artifacts in a networked computing environment. To accomplish this, system 200 can include a set of components (e.g., program modules 42 of FIG. 1) for carrying out embodiments of the present invention. These components can include, but are not limited to, bid request and artifact obtainer 202, cognitive extractor 204, cognitive contextual classifier 206, parameter extractor 208, variable analyzer 210, and role identifier 212.

Through computer system/server 12, system 200 can receive/obtain commercial bid request 220 in a natural language and/or supporting artifacts 230 (e.g., documentation), associated with commercial bid request 220, also in a natural language. Such supporting artifacts 230 may include, for example, historical data 232A (e.g., copies of previous successful/unsuccessful bid proposals), public information 232B (e.g., press releases), and/or correspondence 232C (e.g., letters, emails, etc.).

In some embodiments, system 200 can have access to industry and domain concepts data 240 and content classification taxonomy data 250. In some embodiments, this information or data can be stored within storage system 34 of computer system/server 12. In still other embodiments, this information or data can be obtained from a source outside of computer system/server 12, such as an external database. In still other embodiments, industry and domain concepts data 240 and content classification taxonomy data 250 can be part of a component of system 200, such as cognitive contextual classifier 204.

Through computer system/server 12, system 200 can also receive/obtain information about an organization's resources, roles, and/or personnel (e.g., departments, individuals, other stakeholders), such as in the form of resource organizational hierarchy 260. Resource organizational hierarchy 260 may include, for example, but is not limited to, a tiered list of departments of the organization, a tiered list of roles within the organization, a tiered list of personnel within the organization, etc.

Figure 3:
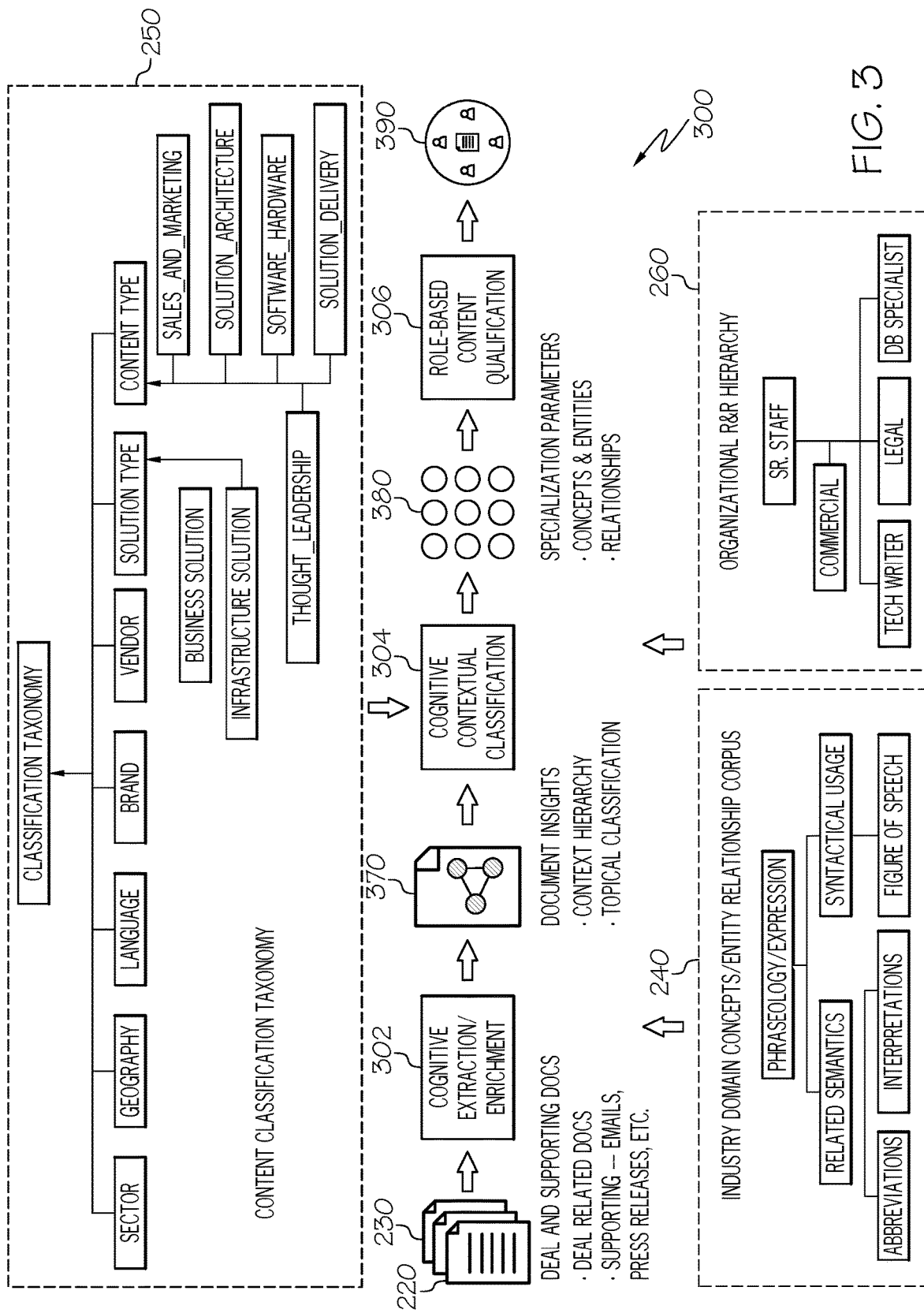
FIG. 3 shows analysis of a commercial bid request to optimize a list of resource roles to generate a response to the request according to illustrative embodiments.

Referring now to FIG. 3 in connection with FIG. 2, analyzing commercial bid request 220 to optimize a list of resource roles to generate a response to request for a commercial bid 220 according to illustrative embodiments is shown. Bid request and artifact obtainer 202 of system 200, as performed by computer system/server 12, can obtain or otherwise receive commercial request for a commercial bid 220 and a plurality of supporting artifacts 230 in a natural language. According to embodiments of the present invention, obtainer 202 can receive a bid request any number of ways. In some embodiments, commercial bid proposal request 220 can be fed to system 200 manually by a user/person or automatically by another system (e.g., in response to a push or pull command). In some other embodiments, obtainer 202 can be configured to seek an incoming commercial bid request 220 being transmitted to an organization (e.g., as an email attachment) or to search for a commercial bid request 220 from a remote source (e.g., as a posting on a website).

In some embodiments, commercial bid request 220 can be a document in a natural language. A natural language is any language that develops naturally for communication between people. This commercial bid request 220 can be a request for a bidder organization (e.g., a commercial company) associated with system 200 to generate a bid or proposal for a bid-seeking/requesting organization (e.g., a commercial company, a government entity) from which request 220 originates. Although there is no industry standard for the composition of a commercial bid request, it should be understood that, according to embodiments of the present invention, commercial bid request 220 may include many sections, detailing "asks", needs, or other requirements of the bid-seeking organization. Commercial bid request 220 may number in the hundreds or even thousands of pages in length. As such, in embodiments of the present invention, commercial bid request 220 can be a natural language document of sufficient complexity and length as to make human review and comprehension of request 220 impractical in a time window provided by request 220.

In addition to commercial bid request 220, bid request and artifact obtainer 202 can obtain a plurality of supporting artifacts 230 in a natural language. In some embodiments, supporting artifacts 230 can include, but are not limited to and need not include, historical data 232A (e.g., copies of previous successful/unsuccessful bid proposals), publicly available information 232B (e.g., press releases), and/or correspondence 232C (e.g., letters, emails, etc.). Supporting artifacts 230 can include any document or other media that may be of assistance in optimizing resource allocation to create a bid responsive to commercial bid request 220. Furthermore, supporting artifacts 230 may be, but need not be, in the same natural language as request 220. In some embodiments, supporting artifacts 230 can be textual documents in a natural language, but are not limited to such. Supporting artifacts 230 can also or alternatively be other media in a natural language, such as sound recordings, videos, and images.

Bid request and artifact obtainer 202 can obtain supporting artifacts 230 from any source and is not limited to obtaining supporting artifacts 230 from the same source from which obtainer 202 obtained commercial bid request 220. In some embodiments, supporting artifacts 230 can be fed to system 200 manually by a user/person or automatically by another system (e.g., in response to a push or pull command). In some other embodiments, obtainer 202 can be configured to seek supporting artifacts 230. To seek supporting artifacts 230, obtainer 202 can, for example, search one or more datastores (e.g., storage system 34 of computer system/server 12 or any other system) or cause such datastores to be searched. For instance, if historical data 232A (e.g., previous deals) or correspondence 232C is stored by a bidder organization, obtainer 202 can review that stored data for pertinent information. To seek supporting artifacts 230, obtainer 202 can also perform an internet search or cause an internet search to be performed to discover information about the bid-seeking organization. Obtainer 202 can use an internet search to find public information 232B, such as press releases, articles about the bid-seeking organization, and information that the bid-seeking organization shares with the public, such as on the bid-seeking organization's website.

In some embodiments, bid request and artifact obtainer 202 can be configured to generate, based on the commercial bid request 220, search queries for searching both local and remote sources of information. For example, based on request 220, obtainer 202 can generate a query that searches for the bid-seeking organization's name in connection to a technological area that request 220 regards. In some embodiments, bid request and artifact obtainer 202 can perform this function subsequent to cognitive extractor 204 (discussed below) extracting document insights 370 from request 220. As such, obtainer 202 can be configured to search for supporting artifacts 230 based on insights 370 extracted from request 220.

Cognitive extractor 204 of system 200, as performed by computer system/server 12, can initiate the performance of a cognitive analysis of commercial bid request 220 and/or supporting artifacts 230 by extracting document insights 370 and information entities from request 220 and/or artifacts 230 at cognitive extraction/enrichment 302. As used here, an entity can be derived from different parameters (discussed in more detail below), while a co-relation between different parameters can be mapped to a single entity. According to embodiments of the present invention, cognitive extractor 204 can include or be in communication with a cognitive analysis system or other artificial neural network system similar to IBM's Watson that uses, for example, IBM's DeepQA software within an Apache UIMA (Unstructured Information Management Architecture) framework. All trademarks and trade names used herein are the property of their respective owners and are used for illustrative and descriptive purposes only. As part of this cognitive analysis process, cognitive extractor 204 can apply industry domain concepts and/or entity relationship corpus 240 to request 220 and/or artifacts 230 to co-relate metadata and information entities contained in request 220 and/or artifacts 230 to produce document insights 370. Such document insights can include, but are not limited to, a context hierarchy and/or a topical classification of the information entities contained in request 220 and/or artifacts 230. According to embodiments of the present invention, this cognitive analysis process can be performed by a cognitive system that has derived a corpus specific to a particular domain based on multiple datasets, establishing a data lake derived from multiple data repositories across a specific domain. Cognitive extractor 204 can use a machine learning discovery algorithm to extract information from request 220 and/or artifacts 230. Cognitive extractor 204 can also or alternatively use cognitive text analytics to map and segment metadata associated with request 220 and/or artifacts 230 to a specific domain. Accordingly, cognitive extractor 204 can index and extract keywords or entities from request 220 based on context, permitting evolution of a self-learning performance model that uses historical insights.

Cognitive contextual classifier 206 of system 200, as performed by computer system/server 12, can classify document insights 370 and other information entities within content classification taxonomy 250 to determine relationships between various document insights 370 and other information entities at 304. According to some embodiments of the present invention, cognitive contextual classifier 206 can employ a scoring method (e.g., a confidence level) to determine related behavioral outliers (i.e., to provide greater accuracy in specific models) based on extracted document insights 370 associated with each specialization dimension of commercial bid request 220. A dimension of commercial bid request 220 is defined as a construct whereby objects or individuals can be distinguished, such as, for example, time, location, confidence level, connectivity management infrastructure, etc. Using this scoring method, cognitive contextual classifier 206 can assign a weighted sum to an information entity or document insight 370. This weighted sum can be configured to decrease in proportion to a traversed distance from an extracted concept node to the insight/entity. Cognitive contextual classifier 206 can use this weighted sum as an index, where a value higher than a predetermined threshold suggests that entity/insight 370 may be more relevant in the context (i.e., to entities which are derived from different datasets having multiple features) and to the dimension. In some embodiments, cognitive contextual classifier 206 can leverage a lexical-relations based graphical database (not shown) to normalize the concepts and entities extracted from request 220 and/or artifacts 230 to determine standardized concepts and entities with which the extracted concepts and entities are most closely associated. Concepts and entities extracted from request 220 and/or artifacts 230 are classified based on different dimensions of the document from which they originated. This classification process permits classification taxonomy 250 to provide context for a specific set of content.

Parameter extractor 208 of system 200, as performed by computer system/server 12, can, for each section or other subdivision of request 220 for a commercial bid, find and extract a set of parameters 380 corresponding with a dimension of request 220 from the standardized concepts and entities of classified document insights and information entities 370. Recognition of parameters 380 can be based on the taxonomy classification and relationship analysis performed by cognitive contextual classifier 206 of insights/entities 370 in a natural language in request 220 and supporting artifacts insights/entities 370 for parameters 380 for each section of request 220 across various dimensions of request 220. In some embodiments, parameters 380 can correspond to one or more variables that can include, but are not limited to, any of the variables listed in the table below. For example, a parameter of parameters 380 can indicate an industry/domain, a client, a nature of a deal, the bid-seeking organization, etc.

Variable analyzer 210 of system 200, as performed by computer system/server 12, can identify a set of predictor variables most likely to indicate a role or stakeholder most suited to contribute to development of a bid responsive to a section or other division of request 220 for a commercial bid based on extracted parameters 380. To accomplish this, variable analyzer 210 can use a self-learning system (previously trained with learning data) to identify input variables that individually or in combination help identify the most suited roles or stakeholders based on context and relationships between various deal related parameters, domain considerations, organization-specific factors, etc. For example, variable analyzer 210 can identify parameters 380 as corresponding to any pre-defined variable such as, but not limited to, the following shown in the table below:

| VARIABLE | AREA | PREDICTOR PARAMETER/ ENTITY | PARAMETER DESCRIPTION |
|---|---|---|---|
| x1 | Deal Related | Request Type | For example, whether a request for information, technical proposal, budgetary estimate, commercial proposal, etc. |
| x2 | | Deal Size | |
| x3 | | Techno-Functional Area | Techno-functional area of investment |
| x4 | | Deal Type | For example, whether greenfield, brownfield, etc. |
| x5 | | Deal Coverage | Project phases to be bid for, for example, consulting, design, implementation, maintenance etc. |
| x6 | Domain or Industry | Industry | |
| x7 | | Sub-domain | |
| x8 | Related | Techno-Functional Area | Techno-functional area of investment |
| x9 | | Geography | Socio-regional factors such as local regulations, taxation, etc. |
| x10 | Client | Client Size | |
| x11 | Related | Historical Spending | Average historical spending on similar deals |
| x12 | | Inclination to Bidder | Historical inclination to bidder in terms of past contracts, etc. |
| x13 | Inclination to Partners | | Composite or individual scores indicating inclination to, for example, hardware, software, consulting, support, ancillary products & services partners, vendors, etc. |
| x14 | Bidder Organization | Bidder Strength in Domain | |
| x15 | Related | Sales Organization Size | |
| x16 | Document Section | Section or Sub-section Topic | |
| x17 | Related | Techno-Functional Entities | Techno-functional entities and related entities for the section |

Role identifier 212 of system 200, as performed by computer system/server 12, can identify, based on the parameters of the identified variable, a role 390 to be involved with the development of a section of a bid responsive to a section or other division of request 220 for a commercial bid at 306. To accomplish this, for each section, role identifier 212 uses a first-order supervised multi-label learning classification algorithm in a self-learning system (previously trained with learning data) to identify one or more roles 390, based on parameters 380 corresponding with the identified variables, which have a probability of being needed to be assigned for one or more dimensions of the bid/proposal development process. In some embodiments, this algorithm can be a model that predicts role 390 required for each dimension/specialization, as a set of binary labels whose values are predicted based on the input predictor variables identified by variable analyzer 210.

For example, in some embodiments, role identifier 212 can use a Multi-Label k-Nearest Neighbor (ML-kNN) model, which is a first-order learning algorithm that reasons the relevance of each output independently of other possible outputs, without attempting to establish correlations between the possible outputs. This permits the k-nearest neighbor model to process discrete labels or output classes using a maximum a posteriori (MAP) rule to make a prediction by reasoning with the labeling information embodied in the neighbors. Role identifier 212 can use this technique to weigh the identified variables based on their determined likelihood to indicate role or stakeholder 390 is suited to contribute to development of a commercial bid, and from this weighting, determine a probability that role 390 is relevant to a particular dimension of request 220, for a given value, range, or other parameter 380 corresponding to the variables.

In some embodiments, parameter extractor 208, variable analyzer 210, and role identifier 212 can iterate their above discussed functions several times until, for each section of request 220, a variance of the outputted probability that a role 390 is relevant is below a pre-defined threshold. Furthermore, each iteration permits enhancement of the influence of the identified predictor variables on each output label, by analyzing the influence across all the predictor variables across various sections of bid request 220. In other words, in cases where there are several predictor variables, some predictor variables have a stronger influence on output, indicated by a higher confidence score for that variable. As will be discussed in more detail below, these identified influencer predictor variables are used to generate a confidence level that a role is relevant for each of a set of identified roles.

Role identifier 212 ultimately outputs identification of a set of roles 390 that are relevant to a particular dimension of request 220 for a commercial bid. Role identifier 212 bases this output on the parameters corresponding to the variables determined during the weighting to be most likely to be indicative of a role's relevance to the commercial bid. In some embodiments, role identifier 212 assigns a set of roles or resources 390 to respond to request 220 for a commercial bid. In one embodiment, role identifier 212 assigns roles 390 with an associated relevance probability over a predetermined threshold probability to respond to request 220. In some embodiments, role identifier 212 can match identified roles 390 to specific personnel within the bidder organization. In still further embodiments, role identifier 212 can assign specific personnel to a group that will respond to request 220 based on a match between a role of identified roles 390 and the person.

Role identifier 212 can express the probabilities that a set of roles 390 are relevant to a particular dimension of request 220 for a commercial bid in any format representative of a probability, such as a percentage (e.g., X % out of 100%) or a fraction (e.g., X1/X2), but are not limited to such. In some embodiments, role identifier 212 can output set of roles 390 as listing 290 of roles ordered or ranked according to a probability that a particular role 390 is relevant to the development of a bid proposal responsive to request 220 for a commercial bid. The role probability output of role identifier 212 need not be ranked according to probability. For example, in some embodiments, roles 390 and their associated probabilities of relevance can be expressed in an alternative order (e.g., alphabetically) or even randomly. In some embodiment, the role probability output of role identifier 212 can be expressed as a truncated list, in which only roles 390 with an associated relevance probability over a predetermined threshold probability are outputted. In still other embodiments, role identifier 212 can be configured to output a probability that a particular role or each of a particular set of roles is relevant to request 220.

Figure 4:
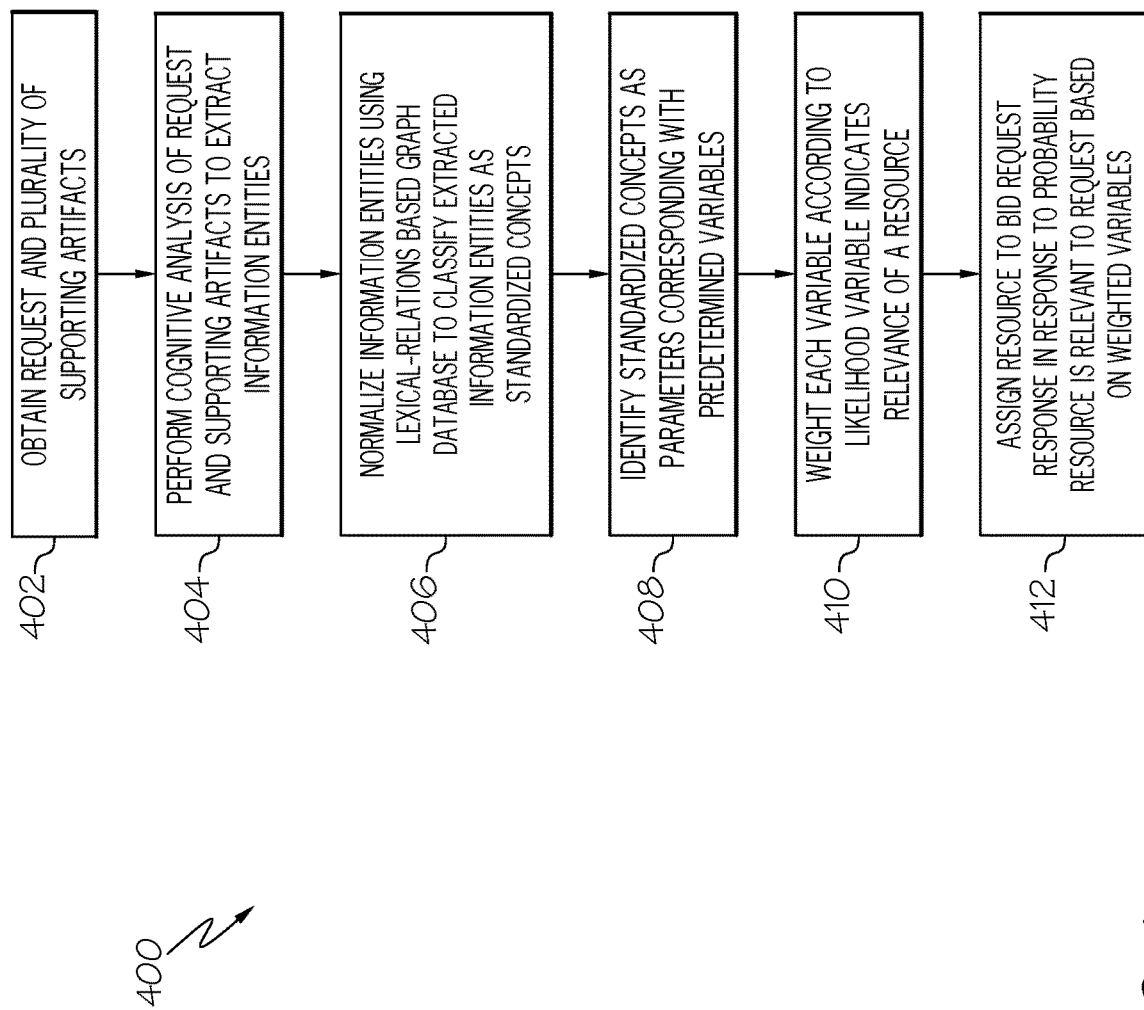
FIG. 4 shows a process flowchart for optimizing resource allocation to a bid request response based on a cognitive analysis of natural language artifacts according to illustrative embodiments.

As depicted in FIG. 4, in one embodiment, a system (e.g., computer system/server 12) carries out the methodologies disclosed herein. Shown is a process flowchart 400 for optimizing resource allocation to a bid request response based on a cognitive analysis of natural language artifacts. At 402, bid request and artifact obtainer 202 obtains a request 220 and a plurality of supporting artifacts 230 in a natural language. At 404, cognitive extractor 204 performs a cognitive analysis 302 of the request 220 and supporting artifacts 230 to extract a set of information entities 370. At 406, cognitive contextual classifier 206 normalizes the extracted information entities 370 using a lexical-relations based graph database 250 to classify the set of extracted information entities 370 as standardized concepts with which the set of extracted information entities 370 are most closely associated. At 408, parameter extractor 208 identifies, for a portion of the request 220, at least a subset of the set of the standardized concepts, with which the set of extracted information entities 370 are most closely associated, as a set of parameters 380 corresponding with a set of predetermined variables. At 410, variable analyzer 210, weights each variable of the set of predetermined variables according to a likelihood that the variable indicates a relevance of a resource 390 to the portion of the request 220. At 412, role identifier 212 assigns a particular resource 390 to the bid request response in response to a probability that the particular resource 390 is relevant to the portion of the request 220 based on the weighted variables.

Process flowchart 400 of FIG. 4 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for optimizing resource allocation to a bid request response based on a cognitive analysis of natural language artifacts. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for optimizing resource allocation to a bid request response based on a cognitive analysis of natural language artifacts. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to optimize resource allocation to a bid request response based on a cognitive analysis of natural language artifacts. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimizing resource allocation to a bid request response based on a cognitive analysis of natural language artifacts, comprising:
   obtaining a request and a plurality of supporting artifacts in a natural language;
   performing a cognitive analysis of the request and supporting artifacts to extract a set of information entities;
   normalizing the extracted information entities using a lexical-relations based graph database to classify the set of extracted information entities as standardized concepts with which the set of extracted information entities are most closely associated;
   identifying, for a portion of the request, at least a subset of the set of the standardized concepts, with which the set of extracted information entities are most closely associated, as a set of parameters corresponding with a set of predetermined variables;
   weighting each variable of the set of predetermined variables according to a likelihood that the variable indicates a relevance of a resource to the portion of the request; and
   assigning a particular resource to the bid request response in response to a probability that the particular resource is relevant to the portion of the request based on the weighted variables.

2. The method of claim 1, the method further comprising generating a list of probabilities that a set of resources are relevant to the portion of the request.

3. The method of claim 1, the determining a probability further comprising applying a first-order supervised multi-label learning classification algorithm to the weighted set of predetermined variables.

4. The method of claim 1, wherein the probability that the particular resource is relevant to the portion of the request has a variance and the method further comprises iterating the identifying, weighting, and determining until the variance is below a pre-defined threshold.

5. The method of claim 1, wherein the plurality of supporting artifacts comprises an artifact selected from the group consisting of: historical data, public information, and correspondence.

6. The method of claim 1, wherein at least one variable of the set of predetermined variables is a variable selected from the group consisting of: request type, deal size, techno-functional area of a deal, deal type, deal coverage, industry, sub-domain of an industry, techno-functional area of an industry, geography, client size, historical spending, inclination to a bidder, inclination to partners, bidder strength in a domain, sales organization size of a bidder, section of the request, and techno-functional entities of the request.

7. The method of claim 1, wherein the likelihood that the variable indicates a relevance of a resource to the portion of the request is based on historical data processed by a self-learning system.

8. A computer system for optimizing resource allocation to a bid request response based on a cognitive analysis of natural language artifacts, the computer system comprising:
   a memory medium comprising program instructions;
   a bus coupled to the memory medium; and
   a processor, for executing the program instructions, coupled to a bid request analysis engine via the bus that when executing the program instructions causes the system to:

obtain a request and a plurality of supporting artifacts in a natural language;

perform a cognitive analysis of the request and supporting artifacts to extract a set of information entities;

normalize the extracted information entities using a lexical-relations based graph database to classify the set of extracted information entities as standardized concepts with which the set of extracted information entities are most closely associated;

identify, for a portion of the request, at least a subset of the set of the standardized concepts, with which the set of extracted information entities are most closely associated, as a set of parameters corresponding with a set of predetermined variables;

weight each variable of the set of predetermined variables according to a likelihood that the variable indicates a relevance of a resource to the portion of the request; and assign a particular resource to the bid request response in response to a probability that the particular resource is relevant to the portion of the request based on the weighted variables.

9. The computer system of claim 8, the instructions further causing the system to generate a list of probabilities that a set of resources are relevant to the portion of the request.

10. The computer system of claim 8, the instructions further causing the system to apply a first-order supervised multi-label learning classification algorithm to the weighted set of predetermined variables.

11. The computer system of claim 8, wherein the probability that the particular resource is relevant to the portion of the request has a variance and the instructions further cause the system to iterate the identifying, weighting, and determining until the variance is below a pre-defined threshold.

12. The computer system of claim 8, wherein the plurality of supporting artifacts comprises an artifact selected from the group consisting of: historical data, public information, and correspondence.

13. The computer system of claim 8, wherein at least one variable of the set of predetermined variables is a variable selected from the group consisting of: request type, deal size, techno-functional area of a deal, deal type, deal coverage, industry, sub-domain of an industry, techno-functional area of an industry, geography, client size, historical spending, inclination to a bidder, inclination to partners, bidder strength in a domain, sales organization size of a bidder, section of the request, and techno-functional entities of the request.

14. The computer system of claim 8, wherein the likelihood that the variable indicates a relevance of a resource to the portion of the request is based on historical data processed by a self-learning system.

15. A computer program product for optimizing resource allocation to a bid request response based on a cognitive analysis of natural language artifacts, the computer program product comprising a computer readable hardware storage device, and program instructions stored on the computer readable hardware storage device, to:

obtain a request and a plurality of supporting artifacts in a natural language;

perform a cognitive analysis of the request and supporting artifacts to extract a set of information entities;

normalize the extracted information entities using a lexical-relations based graph database to classify the set of extracted information entities as standardized concepts with which the set of extracted information entities are most closely associated;

identify, for a portion of the request, at least a subset of the set of the standardized concepts, with which the set of extracted information entities are most closely associated, as a set of parameters corresponding with a set of predetermined variables;

weight each variable of the set of predetermined variables according to a likelihood that the variable indicates a relevance of a resource to the portion of the request; and assign a particular resource to the bid request response in response to a probability that the particular resource is relevant to the portion of the request based on the weighted variables.

16. The computer program product of claim 15, the computer readable storage device further comprising instructions to generate a list of probabilities that a set of resources are relevant to the portion of the request.

17. The computer program product of claim 15, the computer readable storage device further comprising instructions to apply a first-order supervised multi-label learning classification algorithm to the weighted set of predetermined variables.

18. The computer program product of claim 15, wherein the probability that the particular resource is relevant to the portion of the request has a variance and the computer readable storage device further comprising instructions to iterate the identifying, weighting, and determining until the variance is below a pre-defined threshold.

19. The computer program product of claim 15, wherein at least one variable of the set of predetermined variables is a variable selected from the group consisting of: request type, deal size, techno-functional area of a deal, deal type, deal coverage, industry, sub-domain of an industry, techno-functional area of an industry, geography, client size, historical spending, inclination to a bidder, inclination to partners, bidder strength in a domain, sales organization size of a bidder, section of the request, and techno-functional entities of the request.

20. The computer program product of claim 15, wherein the likelihood that the variable indicates a relevance of a resource to the portion of the request is based on historical data processed by a self-learning system.

* * * * *